United States Patent
Liu et al.

(10) Patent No.: US 11,838,090 B2
(45) Date of Patent: Dec. 5, 2023

(54) METHOD AND APPARATUS FOR INFORMATION SHARING

(71) Applicant: Telefonaktiebolaget LM Ericsson (publ), Stockholm (SE)

(72) Inventors: Chunhui Liu, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 155 days.

(21) Appl. No.: 17/610,539

(22) PCT Filed: Jun. 26, 2019

(86) PCT No.: PCT/CN2019/093068
§ 371 (c)(1),
(2) Date: Nov. 11, 2021

(87) PCT Pub. No.: WO2020/258085
PCT Pub. Date: Dec. 30, 2020

(65) Prior Publication Data
US 2022/0216906 A1    Jul. 7, 2022

(51) Int. Cl.
*H04K 1/10* (2006.01)
*H04L 27/28* (2006.01)
(Continued)

(52) U.S. Cl.
CPC .......... *H04B 7/0695* (2013.01); *H04W 24/10* (2013.01)

(58) Field of Classification Search
CPC .... H04B 7/0695; H04B 7/0684; H04W 24/10
(Continued)

(56) References Cited

U.S. PATENT DOCUMENTS 10,098,125 B2    10/2018  Yuan et al.
11,737,081 B2 *   8/2023  Moon ................... H04L 1/0038
                                                                370/329
(Continued)

FOREIGN PATENT DOCUMENTS

CN    103582133 A    2/2014
DE    102011121429 A1    6/2012
(Continued)

OTHER PUBLICATIONS

Khan, Mohammed Saquib, et al., "Cell Selection Technique for Millimeter-Wave Cellular Systems with Hybrid Beamforming", School of Electrical and Electronic Engineering, Chung-Ang University, Seoul 156-756, Korea; https://www.ncbi.nlm.nih.gov/pmc/articles/PMC5492134/, Jun. 21, 2017, pp. 1-21.
(Continued)

*Primary Examiner* — Phuong Phu
(74) *Attorney, Agent, or Firm* — Murphy, Bilak & Homiller, PLLC

(57) ABSTRACT

Various embodiments of the present disclosure provide a method for information sharing. The method which may be performed by a first network node comprises receiving a first measurement report from a terminal device. The terminal device may be capable of communicating with the first network node over a first connection. The method further comprises transmitting first measurement information based at least in part on the first measurement report to a second network node. The terminal device may be capable of communicating with the second network node over a second connection.

19 Claims, 12 Drawing Sheets

(51) Int. Cl.
*H04B 7/06* (2006.01)
*H04W 24/10* (2009.01)

(58) Field of Classification Search
USPC .................. 375/260, 346, 267, 299, 347
See application file for complete search history.

(56) References Cited

U.S. PATENT DOCUMENTS

| 2013/0286960 | A1* | 10/2013 | Li | ............... | H04B 7/0684 370/329 |
|---|---|---|---|---|---|
| 2018/0083680 | A1 | 3/2018 | Guo et al. | | |
| 2018/0192384 | A1 | 7/2018 | Chou et al. | | |
| 2018/0219606 | A1 | 8/2018 | Ng et al. | | |
| 2018/0270730 | A1 | 9/2018 | Martin | | |

FOREIGN PATENT DOCUMENTS

| WO | 2017180335 A1 | 10/2017 |
|---|---|---|
| WO | 2018009462 A1 | 1/2018 |

OTHER PUBLICATIONS

Ramirez-Gutierrez, R, et al., "Antenna Beam Pattern Modulation with Lattice Reduction Aided Detection. IEEE Transactions on Vehicular Technology", White Rose University Consortium, University of Leeds; White Rose Research Online URL for this paper: http://eprints.whiterose.ac.uk/84535/; https://doi.org/10.1109/TVT. 2015.2422299, 2015, pp. 1-23.

"3GPP TS 38.214 V15.1.0", 3rd Generation Partnership Project; Technical Specification Group Radio Access Network; NR; Physical layer procedures for data (Release 15), Mar. 2018, pp. 1-77.

\* cited by examiner

METHOD AND APPARATUS FOR INFORMATION SHARING

FIELD OF THE INVENTION

The present disclosure generally relates to communication networks, and more specifically, to method and apparatus for information sharing.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks are expected to achieve high traffic capacity and end-user data rate with lower latency. In order to meet dramatically increasing network requirements, one interesting option for communication technique development is to enable a terminal device such as a user equipment (UE) to access communication networks using various radio access technologies (RATs) such as long-term evolution (LTE) and new radio (NR) access technologies. For the communication networks supporting different RATs, transmission performance and resource efficiency may vary with network capabilities. For example, beam management for a multi-antenna system can be performed in a NR network but may not be supported well by an LTE network due to limited capability to obtain effective beam information. Thus, it is advantageous to enhance network capabilities efficiently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Wireless communication networks may have different resource configuration and management capabilities. For example, in a NR network employing multiple antenna technology, a next generation NodeB (gNB) can perform beam management by configuring a UE to report measurements on a list of favorable beams and selecting one or more transmission beams for downlink (DL) from the reported favorable beams. However, an LTE network may not support the beam management because an evolved NodeB (eNB) may not be able to obtain effective measurements on one or more beams preferred by a UE due to limited resources and capabilities. In addition, the gNB may be able to obtain more accurate channel information over a specific air interface than the eNB. On the other hand, it is possible for the eNB to get some channel information that can facilitate communications in the LTE network but the NR network may not have. Therefore, it may be desirable to improve information acquisition capability with different communication configurations in an efficient manner.

Various embodiments of the present disclosure propose a solution for information sharing, which can enable measurement information to be exchanged between two network nodes (e.g., network nodes which may be capable of operating on different RATs/cells/bandwidth parts (BWPs)) serving a terminal device, so that the network nodes can benefit from each other to achieve the improved communication performance and resource efficiency.

According to a first aspect of the present disclosure, there is provided a method performed by a first network node (e.g., a gNB). The method may comprise receiving a first measurement report from a terminal device which may be capable of communicating with the first network node over a first connection. The method may further comprise transmitting first measurement information based at least in part on the first measurement report to a second network node. The terminal device may be capable of communicating with the second network node over a second connection.

In accordance with some exemplary embodiments, the first measurement information may be usable to determine resource configuration for at least one of the first network node and the second network node.

In accordance with some exemplary embodiments, the determination of the resource configuration for the at least one of the first network node and the second network node may comprise: determining a candidate beam set according to the first measurement information; and selecting, from the candidate beam set, one or more beams to be assigned to the at least one of the first network node and the second network node as transmission beams to the terminal device.

In accordance with some exemplary embodiments, the method according to the first aspect of the present disclosure may further comprise: receiving second measurement information from the second network node. The second measurement information may be based at least in part on a second measurement report provided to the second network node by the terminal device.

According to a second aspect of the present disclosure, there is provided an apparatus which may be implemented as a first network node. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first network node. The apparatus may comprise a receiving unit and a transmitting unit. In accordance with some exemplary embodiments, the receiving unit may be operable to carry out at least the receiving step of the method according to the first aspect of the present disclosure. The transmitting unit may be operable to carry out at least the transmitting step of the method according to the first aspect of the present disclosure.

According to a fifth aspect of the present disclosure, there is provided a method performed by a second network node (e.g., an eNB). The method may comprise receiving, from a first network node, first measurement information which may be based at least in part on a first measurement report provided to the first network node by a terminal device. The terminal device may be capable of communicating with the first network node and the second network node over a first connection and a second connection, respectively. The method may further comprise determining resource configuration for the second network node, based at least in part on the first measurement information.

In accordance with some exemplary embodiments, the determination of the resource configuration for the second network node may be coordinated with determination of resource configuration for the first network node.

In accordance with some exemplary embodiments, the coordination of the determination of the resource configuration for the first network node and the second network node may comprise: determining a candidate beam set according to the first measurement information; and selecting, from the candidate beam set, one or more beams to be assigned to at least one of the first network node and the second network node as transmission beams to the terminal device.

In accordance with some exemplary embodiments, the method according to the fifth aspect of the present disclosure may further comprise: adjusting a measurement result from the terminal device, according to the first measurement information.

In accordance with some exemplary embodiments, the method according to the fifth aspect of the present disclosure may further comprise: receiving a second measurement report from the terminal device; and transmitting second measurement information to the first network node. The second measurement information may be based at least in part on the second measurement report.

According to a sixth aspect of the present disclosure, there is provided an apparatus which may be implemented as a second network node. The apparatus comprises one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a second network node. The apparatus may comprise a receiving unit and a determining unit. In accordance with some exemplary embodiments, the receiving unit may be operable to carry out at least the receiving step of the method according to the fifth aspect of the present disclosure. The determining unit may be operable to carry out at least the determining step of the method according to the fifth aspect of the present disclosure.

In accordance with some exemplary embodiments, the first network node and the second network node may be configurable to share an antenna unit.

In accordance with some exemplary embodiments, the first measurement report may be related to radio resource sharable by the first network node and the second network node.

In accordance with some exemplary embodiments, the first measurement report may comprise at least one of: channel information, signal quality information, beam information, power information, pathloss information and neighboring cell information.

In accordance with some exemplary embodiments, the one or more beams selected from the candidate beam set may comprise one or more first beams to be assigned to the first network node and one or more second beams to be assigned to the second network node. In this case, the beams selected from the candidate beam set may have a correlation satisfying a first correlation criterion.

In accordance with some exemplary embodiments, the one or more beams selected from the candidate beam set may comprise one or more first beams to be assigned to the first network node. In this case, the one or more first beams and a second beam which is assigned to the second network node may have a correlation satisfying a second correlation criterion.

In accordance with some exemplary embodiments, the selection of the one or more beams may be performed by at least one of the first network node and the second network node according to a predefined rule.

In accordance with some exemplary embodiments, the first measurement information may be usable by the second network node to adjust a measurement result from the terminal device.

In accordance with some exemplary embodiments, the first measurement information may be usable to determine transmission configuration for the terminal device by at least one of the first network node and the second network node.

In accordance with some exemplary embodiments, the second measurement information may be usable to determine transmission configuration for the terminal device by at least one of the first network node and the second network node.

In accordance with some exemplary embodiments, the second measurement report may be related to radio resource sharable by the first network node and the second network node. According to an exemplary embodiment, the second measurement report may comprise at least one of: channel information, signal quality information, beam information, power information, pathloss information and neighboring cell information.

In accordance with some exemplary embodiments, the first connection may be based on a first RAT, and the second connection may be based on a second RAT.

In accordance with some exemplary embodiments, the first RAT may comprise a NR based RAT, and the second RAT may comprise an LTE based RAT.

In accordance with some exemplary embodiments, the first connection may be used for a first cell of the terminal device, and the second connection may be used for a second cell of the terminal device.

In accordance with some exemplary embodiments, the first connection may use a first BWP, and the second connection may use a second BWP.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
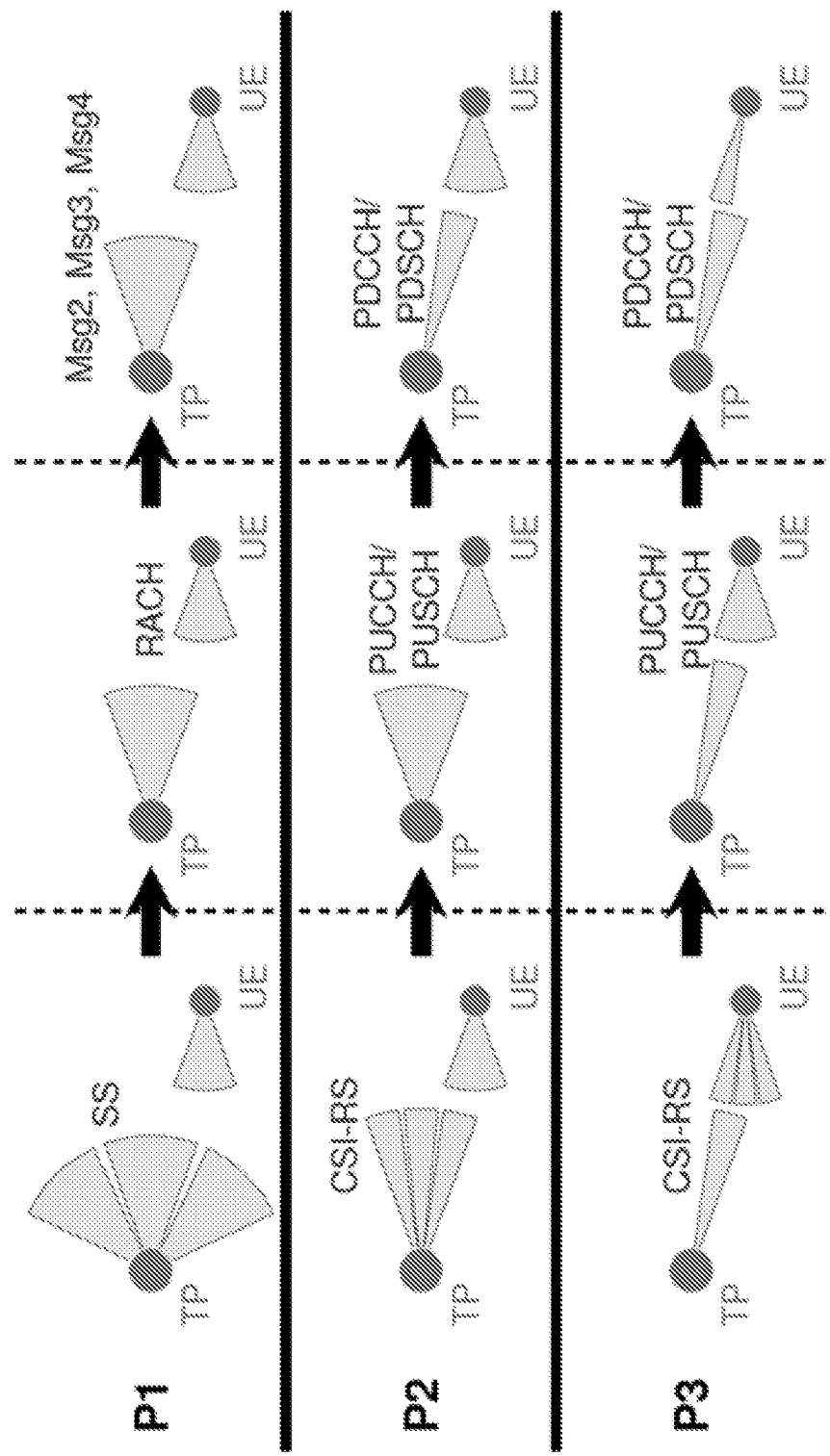
FIG. 1 is a diagram illustrating an example of beam management according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

From analog communication technologies through LTE, each generation of mobile technology is motivated by the need to address the challenges which are not overcome by its predecessor. The mobile technology such as 5G is positioned to address the demands and business beyond LTE. It is expected to enable a fully mobile and connected society, related to the tremendous growth in connectivity and density/volume of traffics that may be required in the near future.

Multiple antenna systems such as massive multiple-input multiple-output (MIMO) systems (also known as large-scale antenna systems, very large MIMO, hyper MIMO, full-dimension MIMO, array for real-time geostrophic oceanography (ARGOS), etc.) makes a clean break with current practice through the use of a very large number of service antennas (e.g., hundreds or thousands) that are operated fully coherently and adaptively. It is allowed in a multiple antenna system to transmit signals focused towards certain spatial regions. This creates beams (also referred to as beamforming) whose coverage can go beyond transmissions using non-beamformed signals. Beam management can help achieve potentially performance gain by fine beam alignment for directional links. Extra antennas can further facilitate radio communications by focusing the transmission and reception of signal energy into ever-smaller regions of space. This brings huge improvements in throughput and energy efficiency, in particularly when combined with simultaneous scheduling of a large number of user terminals (e.g., tens or hundreds).

Next-generation communication networks can provide a set of mechanisms by which UEs and gNBs can establish highly directional transmission links, typically using high-dimensional phased arrays, to benefit from the resulting beamforming gain and sustain the acceptable communication quality. Directional links, however, require fine alignment of transmission (Tx) and reception (Rx) beams, which may be achieved through a set of operations related to beam management. The beam management is fundamental to perform a variety of control tasks including initial access of idle users, which allows a UE to establish a physical link connection with a gNB, and beam tracking for connected users, which enables beam adaptation schemes, handover, path selection and/or radio link failure recovery procedures.

FIG. 1 is a diagram illustrating an example of beam management according to an embodiment of the present disclosure. For simplicity, FIG. 1 only schematically depicts beam selection and alignment for a UE and a transmit point (TP) such as a gNB. It will be appreciated that signaling messages and channel configurations shown in FIG. 1 are just as examples, and more or less alternative signaling messages and channel configurations may be involved in the beam management according to the embodiments of the present disclosure.

The beam management may be performed in a 5G/NR network where various downlink (DL) reference signals are defined to measure the beams applied to the DL and uplink (UL) control and data traffic channels. As shown in FIG. 1, an exemplary beam management procedure in the 5G/NR network may comprise the following three phases:

P1: initial beam selection, where a broadcasting TP Tx beam is initially selected;

P2: TP Tx beam refinement, where the TP determines its Tx beam according to the UE's report; and P3: UE Rx beam refinement, where a UE Rx beam is determined in the case that the TP Tx beam is selected.

In the exemplary beam management procedure, during phase P1, the UE can access the network through random access channel (RACH) based on a synchronization signal (SS) from the TP, and exchange messages such as Msg2, Msg3 and Msg4 with the gNB. During phase P2, the TP can configure channel state information-reference signal (CSI-RS) for the UE to measure available beams. Then the UE can report a list of beam candidates and their corresponding quality values, e.g., reference signal receiving power (RSRP) and etc., through physical uplink control channel/physical uplink shared channel (PUCCH/PUSCH). On reception of this report, the TP can select a beam as the DL Tx beam for this UE and perform the corresponding DL transmissions on physical downlink control channel/physical downlink shared channel (PDCCH/PDSCH). Afterwards, the UE during phase P3 can select its Rx beam for the TP, according to the DL Tx beam selected by the TP.

In the beam management procedure, a base station such as a gNB is able to send DL reference signals dedicated for beam measurement. Correspondingly, a terminal device such as a UE is able to measure these reference signals and to report its favorable beams to the gNB. In response to reception of the report from the UE, the gNB can select one or more proper beams from the reported favorable beams and apply the selected beams. Optionally, the DL and UL beams can be deduced provided beam correspondence. Alternatively, the DL and UL beams can be determined by reference signals over DL and UL, respectively.

For LTE based communications, especially for LTE UEs without the features for beam management while being popularly used, no air interface is provided to support the beam management. In this case, UL reference signals may need to be used to derive spatial information about UEs supported by channel reciprocity. This may result in much computing load for UL processing to extract spatial information from channel estimates, and the system throughput may be reduced due to transmission of UL reference signals and dependency between UL and DL. A possible approach to avoid such issues is to measure the beams over a frequency and apply the beams over another frequency, although the measurements may not be accurate. It can be realized that the existing beamforming solutions in the LTE network may have the following problems:

(i) Cell reference signal (CRS) based channel measurement is not suitable for UE specific beamforming.

In the LTE network, most of legacy UEs can only support measurements of the channel quality by the DL reference signals such as CRS, which is shared by all UEs. Thus, when a gNB sends the CRS, it needs to ensure that the CRS can be visible by all or most UEs covered by the cell of this gNB. A broadcasting beam is chosen for the CRS. A UE in the cell can measure the CRS and feedback the channel quality via channel quality information (CQI) reporting. When the massive MIMO narrow beam is applied to PDSCH or PUSCH, the rank and CQI report based on CRS over a broadcasting beam may not comply with the traffic channel over a narrow beam.

This issue may severely impact link adaptation and rank selection, even though some legacy implementations try to use the reciprocity based channel measurement to predict the DL channel status with the narrow beam. Unfortunately, a UL and a DL do not share the same interference usually, and this prediction may fail in the case that the UL and the DL suffer different interference.

(ii) Reciprocity based beamforming is network capacity limited.

If a UL sounding reference signal (SRS) is used for a UE to detect channel quality and perform DL beamforming in every cell, there may be some SRS capacity issues. As an example, for a busy cell serving a large number of UEs, there may not be enough SRSs which can be configured for all connected UEs to implement the UL sounding. On the other hand, transmission of a lot of SRSs in a cell may introduce serious SRS interference, and eventually make SRS channel interference limited.

(iii) Reciprocity based beamforming is UE capability limited.

In many scenarios (e.g., carrier aggregation, etc.), most of LTE UEs can only send sounding signals on primary cell (Pcell) while not on secondary cell (Scell). This implies that the reciprocity-based processing can only be performed on the Pcell.

In order to improve the system performance of different network configurations, various exemplary embodiments of the present disclosure propose an efficient solution for inter-RAT/cell/BWP information sharing between network nodes or baseband devices to enhance network capabilities without increasing processing load on a terminal device. According to an exemplary embodiment, a network node such as a gNB can forward a measurement report (e.g., a CSI report) from a terminal device such as a UE to another network node such as an eNB. The measurement report from the gNB may be used to assist the eNB to perform the LTE processing (e.g., beam management, resource allocation, etc.) especially for massive MIMO radio communications. Optionally, the eNB may provide some channel information (e.g., pathloss estimation, power information, etc.) of the UE to the gNB, so that the gNB does not need to additionally collect the channel information shared by the eNB, which can reduce signaling overhead and save energy of the gNB. The proposed solution according to the exemplary embodiments may be applicable in a network scenario where a communication network can support inter-RAT connection. In accordance with an exemplary embodiment, the communication network can configure dynamic spectrum sharing (DSS) for the LTE band with the NR band, so as to enable measurements on the NR band can be applied for the LTE band. The proposed solution may not be restricted to inter-RAT interface or connection between the eNB and the gNB, and may also applicable to the use cases of carrier aggregation such as inter-cell or inter-BWP coordination, even intra-cell inter-BWP coordination.

Figure 2:
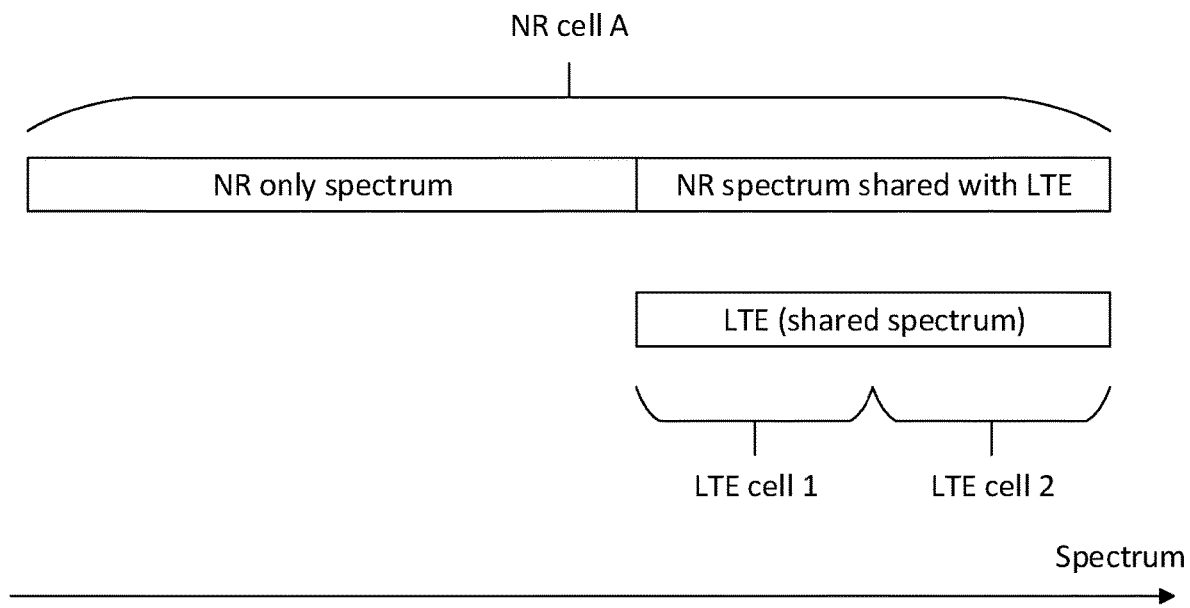
FIG. 2 is a diagram illustrating an exemplary spectrum configuration according to an embodiment of the present disclosure.

FIG. 2 is a diagram illustrating an exemplary spectrum configuration according to an embodiment of the present disclosure. The exemplary spectrum configuration shown in FIG. 2 may be applied in communication networks supporting NR and LTE deployment. For example, at the initial stage of NR deployment, due to limited NR coverage, most network operators may tend to configure a UE to have the dual connectivity to LTE and NR network nodes. According to the exemplary spectrum configuration, the spectrum for NR cell A can be divided into two parts, including NR only spectrum and NR spectrum shared with LTE, as shown in FIG. 2. The shared spectrum can be assigned to LTE cell 1 and LTE cell 2, for example, according to the DSS configuration.

In accordance with an exemplary embodiment where the DSS is configured, even though a UE is transmitting data in the LTE band, this UE can still use measurement from the NR band to improve its link performance (e.g., beamforming and link adaptation). According to the exemplary embodiment, a NR node such as a gNB serving the UE can send reference signals to the UE over different narrow beams. The UE can measure the reference signals from the gNB, and report a measurement result (e.g., channel quality, beam information) for the corresponding narrow beams to the gNB, respectively. The measurement result from the UE may be indicated in or derived from a CSI report, for example, including but not limited to a channel quality information (CQI) report, a rank report, a precoding matrix indicator (PMI) report (e.g., about a predefined precoding matrix), physical layer-reference signal receiving power (L1-RSRP), etc. The gNB can forward the measurement result and/or other information (e.g., the post-processed information based on the measurement result, etc.) to an LTE node such as an eNB serving the UE. As an example, the UE may report its transmission power (e.g., power headroom) to the gNB, and the gNB can estimate the UL pathloss for the UE according to the equation (Rx power−Tx power=pathloss) by measuring the received power from the UE. According to an exemplary embodiment, the gNB can forward the measurements about Tx power and Rx power to the eNB. Alternatively or additionally, the gNB can forward the pathloss estimation to the eNB directly. Based at least in part on the measurement result and/or other information on the NR band, for example, the subband CSI reported by the UE, the gNB and optionally the eNB can derive the beam weights and the related effective signal to interference plus noise ratio (SINR) for data traffics of the UE.

In accordance with some exemplary embodiments, if an LTE node can achieve some information (e.g. power headroom, UL pathloss estimation, neighboring cell measurement, etc.) that a NR node does not have, or the measurement of this kind of information can be omitted or skipped by the NR node to save overhead, the information measured by the LTE node can be forwarded to the NR node to assist in NR working. It can be seen that the inter-RAT channel information and/or measurement information sharing between 4G/LTE and 5G/NR can make the LTE and NR nodes benefit from each other and enhance the network performance of the two RATs efficiently. For example, the beamforming information for the UE provided by the NR node can assist the LTE node to perform beam management for the UE. On the other hand, a power headroom report of the UE obtained from the LTE node can enable the NR node to configure UL transmission power of the UE adaptively and accurately, without receiving power information from the UE.

In accordance with an exemplary embodiment, the NR node and the LTE node may be implemented as logical or physical entities in a communication system. Optionally, the NR node and the LTE node may share the same radio or antenna unit to communicate with a terminal device. For example, the NR node and the LTE node may be implemented as NR and LTE basebands (BBs) in the communication system, respectively. The NR BB and the LTE BB can be connected to the same radio end for wireless communication.

Figure 3:
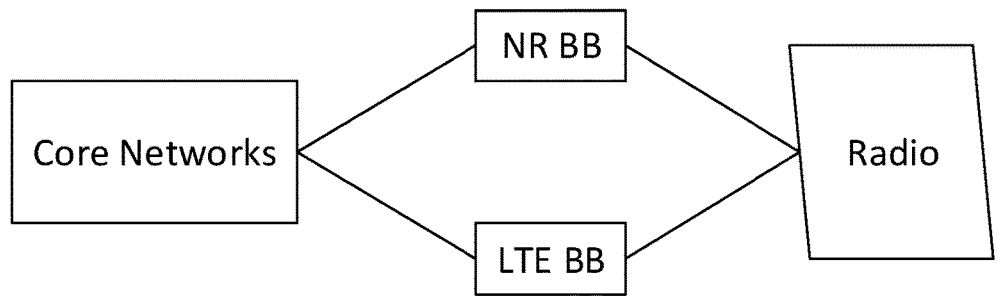
FIG. 3 is a diagram illustrating an exemplary system overview according to some embodiments of the present disclosure.

FIG. 3 is a diagram illustrating an exemplary system overview according to some embodiments of the present disclosure. For simplicity, FIG. 3 only depicts exemplary networks and network elements such as core networks, NR BB, LTE BB and a radio (e.g., an antenna system). As shown in FIG. 3, the LTE BB and the NR BB can share the same radio and antenna system. In an exemplary embodiment, the antenna system may be equipped with massive MIMO technology, and there may be a lot of beams defined by different beamforming weights. According to exemplary embodiments, the NR BB and the LTE BB may be located at one hardware (HW) entity or at different HW entities. It will be appreciated that there may be other network scenarios where more than one NR BB entity and/or more than one LTE BB entity can be deployed in the network to implement different system structures and provide services to one or more terminal devices.

Figure 4:
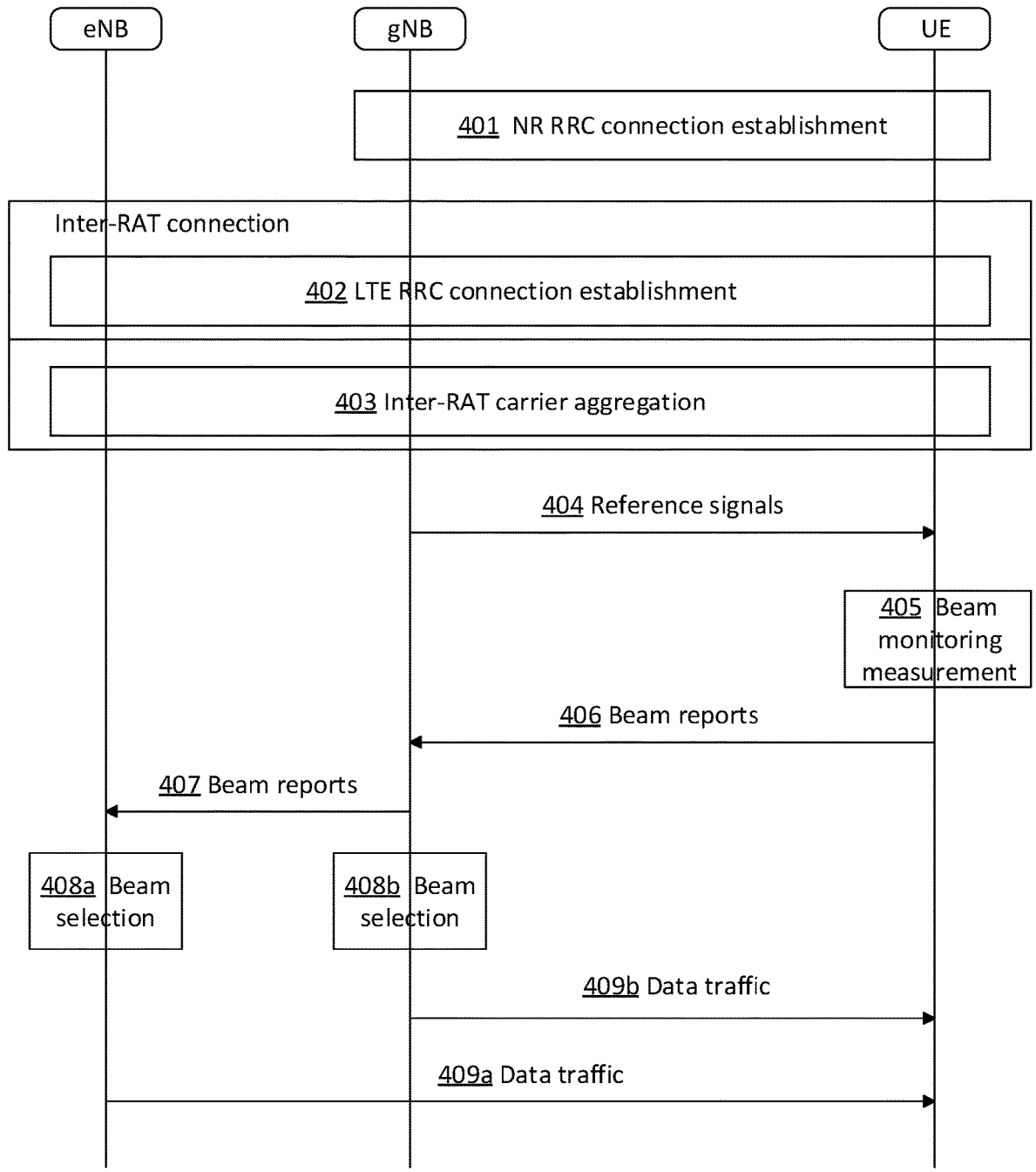
FIG. 4 is a diagram illustrating an exemplary inter-RAT beam management procedure according to some embodiments of the present disclosure.

FIG. 4 is a diagram illustrating an exemplary inter-RAT beam management procedure according to some embodiments of the present disclosure. The exemplary inter-RAT beam management procedure may be performed in the system as shown in FIG. 3 or other suitable system supporting inter-RAT connection. For simplicity, FIG. 4 only depicts the main network elements participating in the inter-RAT beam management procedure, including a UE, a gNB and an eNB. It can be appreciated that communication connections, signaling interaction and network elements shown in FIG. 4 are just as examples, and more or less communication connections, signaling interaction and network elements may be involved in the implementation of the inter-RAT beam management procedure.

In accordance with some exemplary embodiments where the LTE based communication has no air interface for beam management, the NR based beam measurement may be utilized to implement the beam management for the LTE based communication. As shown in FIG. 4, a 5G/NR radio resource control (RRC) connection may be established 401 between the UE and the gNB. In an exemplary embodiment, a 4G/LTE RRC connection may be established 402 between the UE and the eNB. Optionally, the UE may be in dual connection to the gNB and the eNB. According to an exemplary embodiment in which the inter-RAT carrier aggregation 403 is applicable, a NR cell may serve the UE as a first carrier and an LTE cell may server the UE as a second carrier.

According to the beam management procedure shown in FIG. 4, the gNB may send 404 reference signals to the UE which can perform 405 beam monitoring and measurement. Based on measurements on one or more beams, the UE may send 406 one or more beam reports to the gNB to indicate beam information. According to an exemplary embodiment, the gNB can forward 407 the beam reports received from the UE to the eNB. Optionally, the gNB may receive other measurement reports from the UE, for example, including but not limited to a CQI report, a rank report, a PMI report, a L1-RSRP report, a power headroom report, etc. The gNB can forward one or more received measurement reports from the UE to the eNB directly. Alternatively or additionally, the gNB can derive some measurement information by processing the measurement reports received from the UE, and transmit the derived measurement information to the eNB. According to beam information indicated by the beam reports and/or derivable from other measurement reports, the gNB and the eNB can select the corresponding beams for data traffic transmissions to the UE.

In accordance with some exemplary embodiments, the beam selection 408a for the LTE based data traffic transmission 409a and the beam selection 408b for the NR based data traffic transmission 409b may be performed by a single entity in a centralized manner, or by more than one entity in a distributed manner. For example, the beam selection can be performed by coordination between the eNB and the gNB. Optionally, one of the eNB and the gNB can select the respective beams for LTE and NR, and then exchange a result of the beam selection with the other of the eNB and the gNB.

In accordance with an exemplary embodiment where the NR based communication and the LTE based communication are operated in the same band or may interfere with each other, the gNB and the eNB can jointly select beams to ensure a beam used for the LTE based communication is less correlated with a beam used for the NR based communication. According to an exemplary embodiment, an RSRP or SINR threshold may be set to filter a set of candidate beams from the beams reported to the gNB by the UE. Let t denote the set of beam candidates. For any two beams i and j in the set of beam candidates, a beam correlation can be denoted by $\sigma(i, j), i \neq j$ and $i,j \in \Phi$. Then two beams in and n with the minimum correlation in the set of beam candidates, i.e., $(m, n) \leftarrow \min(\sigma(i,j)), i \neq j$ and $i,j \in \Phi$, can be selected as target beams, one for the NR based communication and the other for the LTE based communication. It will be appreciated that there may be other proper criteria applicable for selection of the target beams.

In the case that multiple beams are needed for one RAT, the target beams may be selected such that the beam correlation of the target beams satisfies a predefined correlation criterion (e.g., having the minimum correlation). Then a part of the selected target beams can be assigned to the NR based communication, and optionally the remaining can be assigned to the LTE based communication. According to an exemplary embodiment, an LTE beam can be mapped to a NR beam according to a predefined mapping rule, which may be used by the gNB and the eNB to perform the beam selection and/or interpret a result of the beam selection.

In accordance with an exemplary embodiment, one or more beams may be preconfigured or assigned to at least one of the gNB and the eNB. In this case, the beam selection 408a and 408b may be dependent on the preconfigured/ assigned beam(s). For example, the eNB may be assigned a beam according to the reciprocity-based beamforming. Compared to other beams in the set of beam candidates, a candidate beam which has the minimum correlation with the reciprocity-based beam assigned to the eNB can be selected for the gNB.

In accordance with an exemplary embodiment where the reciprocity-based beamforming is applied by the eNB for the LTE based communication, the channel quality reported to the eNB by the UE can be adjusted according to the difference between the grid of beam (GoB) and the reciprocity-based beam. For example, the SINR reported over the LTE band (e.g., corresponding to the reciprocity-based beam) may be adjusted as $SINR = SINR_{CQI} - G_{GoB} + G_{RB}$, where $SINR_{CQI}$ refers to the SINR reported over the NR band (which includes the interference from the NR band towards the LTE band due to DSS), $G_{GoB}$ is the beamforming gain corresponding to $SINR_{CQI}$ over the NR band, and $G_{RB}$ is the beamforming gain for the reciprocity-based beam over the LTE band. It will be realized that the measurement information from the gNB can also be used to adjust or correct other measurements on the LTE band, so that the eNB can adjust resource allocation and/or transmission configuration such as channel parameters (e.g., the channel rank), control information, modulation and coding scheme (MCS) and/or the like for the communication with the UE.

In accordance with an exemplary embodiment, in response to reception of a power headroom report at one RAT node (e.g., the gNB or the eNB as shown in FIG. 4), the Tx power at the UE side for two RATs can be adjusted to achieve more accurate and in-time power control. It could be realized that an interface between the two RATs can be maintained to enable exchanging of measurement information (and optionally the corresponding resource and transmission configuration) between the gNB and the eNB.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 5:
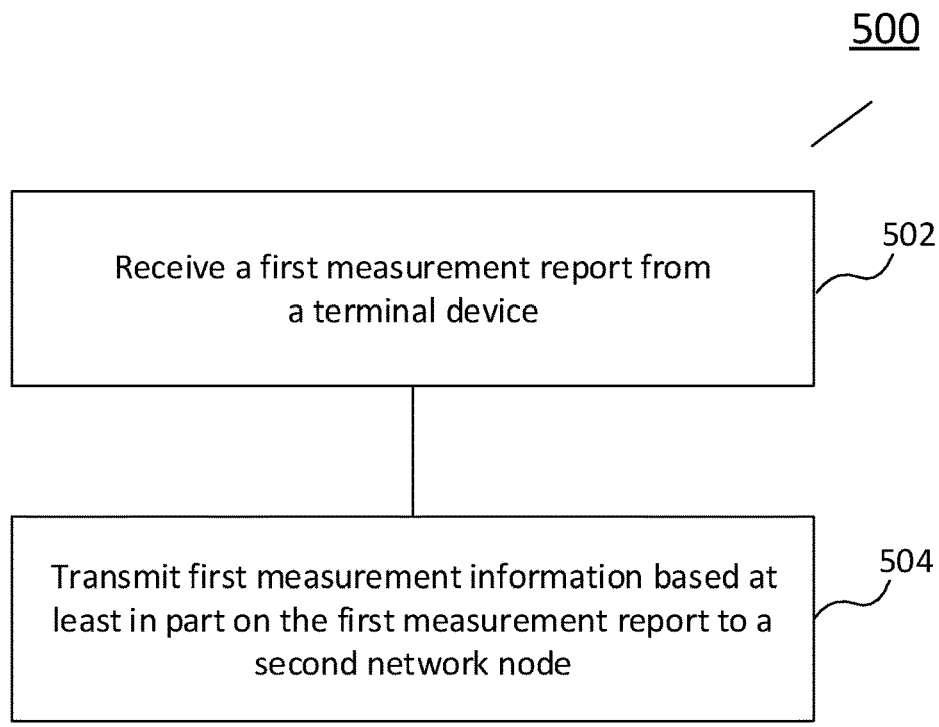
FIG. 5 is a flowchart illustrating a method according to some embodiments of the present disclosure.

FIG. 5 is a flowchart illustrating a method 500 according to some embodiments of the present disclosure. The method 500 illustrated in FIG. 5 may be performed by a first network node or an apparatus communicatively coupled to the first network node. In accordance with an exemplary embodiment, the first network node may comprise a BS, an AP, a TP, a BB device or any other suitable entity which may be able to support information exchange with a second network node. The first network node may be capable of serving one or more terminal devices such as UEs according to specific communication configuration.

According to the exemplary method 500 illustrated in FIG. 5, the first network node can receive a first measurement report from a terminal device, as shown in block 502. The terminal device may be capable of communicating with the first network node over a first connection. According to some exemplary embodiments, the first network node can transmit first measurement information based at least in part on the first measurement report to a second network node, as shown in block 504. The terminal device may be capable of communicating with the second network node over a second connection.

In accordance with some exemplary embodiments, the first network node and the second network node may be configurable to share an antenna unit. For example, the first network node (e.g., a gNB or a NR BB device) and the second network node (e.g., an eNB or an LTE BB device) may be coupled to the same radio or antenna system as shown in FIG. 3.

In accordance with some exemplary embodiments, the first measurement report may be related to radio resource (e.g., frequency resource, antenna resource, etc.) sharable by the first network node and the second network node. For example, the terminal device can report some measurements on the radio resource to the first network node. According to an exemplary embodiment, the first measurement report may comprise at least one of:

channel information (e.g., CQI, PMI, rank information, etc.);
signal quality information (e.g., RSRP, reference signal receiving quality (RSRQ), SINR, etc.);
beam information (e.g., beam measurement, beam indicator/index, etc.);
power information (e.g., power headroom, Tx/Rx power, etc.);
pathloss information (e.g., pathloss estimation); and
neighboring cell information (e.g., interference measurement, resource configuration, etc.).

In accordance with some exemplary embodiments, the first measurement information may be usable to determine resource configuration (e.g., beam configuration, power configuration, etc.) for at least one of the first network node and the second network node. That is to say, the first measurement information may be applicable for joint resource configuration or separate resource configuration for the first network node and the second network node.

In accordance with some exemplary embodiments, the determination of the resource configuration for the at least one of the first network node and the second network node may comprise: determining a candidate beam set according to the first measurement information, and selecting, from the candidate beam set, one or more beams to be assigned to the at least one of the first network node and the second network node as transmission beams to the terminal device.

In accordance with some exemplary embodiments, the selection of the one or more beams may be performed by at least one of the first network node and the second network node according to a predefined rule. For example, the first network node and the second network node can select the one or more beams jointly. Optionally, the one or more beams may be selected from the candidate beam set by one of the first network node and the second network node, and a result of the beam selection can be informed to the other of the first network node and the second network node.

According to an exemplary embodiment, the one or more beams selected from the candidate beam set may comprise one or more first beams to be assigned to the first network node and one or more second beams to be assigned to the second network node. In this case, the selected beams may have a correlation satisfying a first correlation criterion (e.g., the correlation of the first beam(s) and the second beam(s) is lower than that of any other combinations of the beams in the candidate beam set).

In another exemplary embodiment where the second network node is assigned a second beam, the one or more beams selected from the candidate beam set may comprise one or more first beams to be assigned to the first network node. In this case, the one or more first beams and the second beam may have a correlation satisfying a second correlation criterion (e.g., the correlation of the second beam and the first beam(s) is lower than that of the second beam and other beams in the candidate beam set).

In accordance with some exemplary embodiments, the first measurement information may be usable by the second network node to adjust a measurement result (e.g., SINR, channel rank or other possible measurements) from the terminal device. Alternatively or additionally, the first measurement information may be usable to determine transmission configuration (e.g., power control, transmission parameter settings, etc.) for the terminal device by at least one of the first network node and the second network node. For example, the first network node and the second network node can use the first measurement information such as power headroom to configure Tx power of the terminal device respectively for the first connection and the second connection.

In accordance with some exemplary embodiments, the first network node may receive second measurement information from the second network node. The second measurement information may be based at least in part on a second measurement report provided to the second network node by the terminal device. Similar to the first measurement report, the second measurement report may be related to radio resource sharable by the first network node and the second network node. As an example, the second measurement report may comprise at least one of: channel information, signal quality information, beam information, power information, pathloss information and neighboring cell information.

In response to the reception of the second measurement information, the first network node can perform communication configuration and resource optimization for the terminal device, for example, by utilizing the second measurement information from the second network node. According to an exemplary embodiment, the second measurement information may be usable to determine transmission configuration (e.g., power control, transmission parameter settings, etc.) for the terminal device by at least one of the first network node and the second network node.

In accordance with some exemplary embodiments, the first connection between the first network node and the terminal device may be based on a first RAT, and the second connection between the second network node and the terminal device may be based on a second RAT. As an example, the first RAT may comprise the NR based RAT, and the second RAT may comprise the LTE based RAT.

In accordance with some exemplary embodiments, the first connection between the first network node and the terminal device may be used for a first cell of the terminal device, and the second connection between the second network node and the terminal device may be used for a second cell of the terminal device. In this case, the first cell and the second cell may share radio resource such as a specific frequency band, so that measurements on the specific frequency band reported by the terminal device over one of the first connection and the second connection can be utilized by both the first network node and the second network node. According to an exemplary embodiment, the first cell and the second cell of the terminal device may be based on the same RAT or different RATs.

In accordance with some exemplary embodiments, the first connection between the first network node and the terminal device may use a first BWP, and the second connection between the second network node and the terminal device may use a second BWP. In this case, the first BWP may comprise a set of physical resource blocks of which at least a part can be shared by the second BWP, so that measurements on the shared physical resource blocks reported by the terminal device over one of the first connection and the second connection can be utilized by both the first network node and the second network node. According to an exemplary embodiment, the first BWP and the second BWP may be configured based on the same RAT or different RATs.

Figure 6:
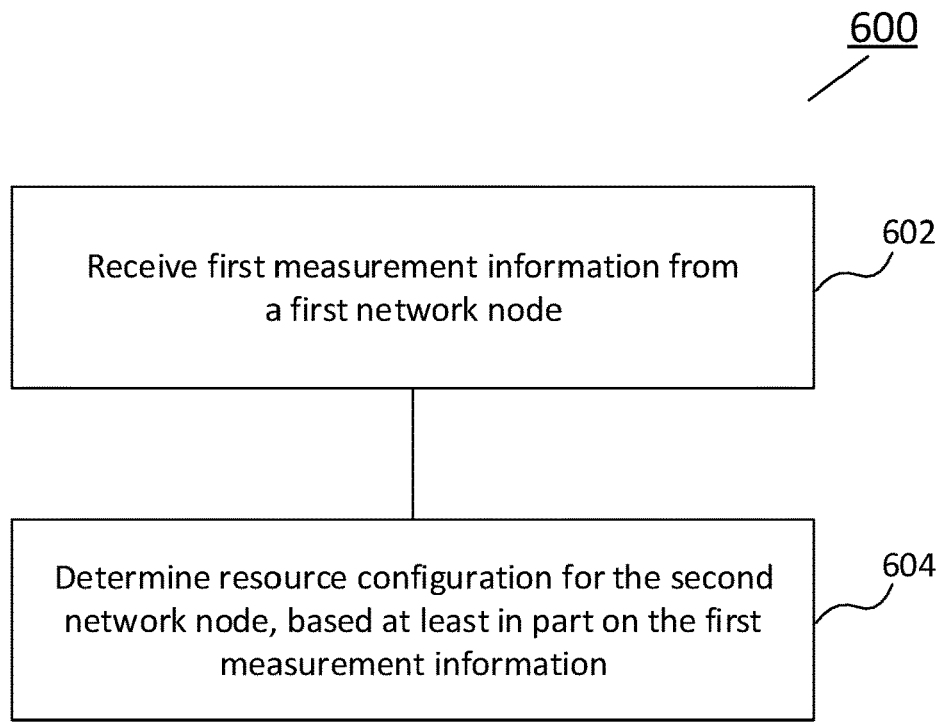
FIG. 6 is a flowchart illustrating another method according to some embodiments of the present disclosure.

FIG. 6 is a flowchart illustrating a method 600 according to some embodiments of the present disclosure. The method 600 illustrated in FIG. 6 may be performed by a second network node or an apparatus communicatively coupled to the second network node. In accordance with an exemplary embodiment, the second network node may comprise a BS, an AP, a TP, a BB device or any other suitable entity which may be able to support information exchange with a first network node (such as the first network node described with respect to FIG. 5). The second network node may be capable of serving one or more terminal devices such as UEs according to specific communication configuration.

It can be appreciated that operations/steps of the method 600 illustrated in FIG. 6 may correspond to operations/steps of the method 500 illustrated in FIG. 5, the second network node described in connection with FIG. 5 may be operable to perform the method 600 illustrated in FIG. 6, and the first network node described in connection with FIG. 6 may be operable to perform the method 500 illustrated in FIG. 5. Optionally, the first network node and the second network node can be configurable to share one or more antenna units.

According to the exemplary method 600 illustrated in FIG. 6, the second network node can receive first measurement information from a first network node, as shown in block 602. The first measurement information may be based at least in part on a first measurement report provided to the first network node by a terminal device. The terminal device may be capable of communicating with the first network node and the second network node over a first connection and a second connection, respectively. In an exemplary embodiment, the first measurement report may be related to radio resource sharable by the first network node and the second network node. It will be appreciated that the first measurement information received by the second network node as described in block 602 may correspond to the first measurement information transmitted by the first network node as described in block 502.

Based at least in part on the first measurement information, the second network node can determine resource configuration for the second network node, as shown in block 604. In accordance with some exemplary embodiments, the determination of the resource configuration for the second network node may be coordinated with determination of resource configuration for the first network node. Optionally, the determination of the resource configuration for the second network node may be independent from the determination of the resource configuration for the first network node.

In accordance with some exemplary embodiments, the coordination of the determination of the resource configuration for the first network node and the second network node may comprise: determining a candidate beam set according to the first measurement information; and selecting, from the candidate beam set, one or more beams to be assigned to at least one of the first network node and the second network node as transmission beams to the terminal device. According to an exemplary embodiment, the selection of the one or more beams may be performed by at least one of the first network node and the second network node according to a predefined rule.

As described with respect to FIG. 5, the one or more beams selected from the candidate beam set may comprise first and second beams respectively selected for the first network node and the second network node, for example, according to a first correlation criterion. In the case that the second network node is assigned or preconfigured a second beam, the selection of the one or more beams from the candidate beam set may be performed for the first network node according to a second correlation criterion. In an exemplary embodiment, one or more first beams may be selected from the candidate beam set to be assigned to the first network node, and a correlation between the first beam(s) and the second beam is lower than that of the second beam and any other beams in the candidate beam set.

In accordance with some exemplary embodiments, the second network node can adjust a measurement result (e.g., SINR, channel rank, beam measurement, etc.) reported from the terminal device, according to the first measurement information. Optionally, the first measurement information may be usable to determine or adapt transmission configuration (e.g., power control, transmission parameter settings, etc.) for the terminal device by at least one of the first network node and the second network node.

In accordance with some exemplary embodiments, the second network node can receive a second measurement report from the terminal device. The second measurement report may be related to radio resource sharable by the first network node and the second network node. Optionally, the second network node can transmit second measurement information to the first network node. The second measurement information may be based at least in part on the second measurement report, so that the second network node can share specific information about channel/beam/signal quality/power/pathloss/neighboring cell with the first network node. By using the second measurement information, the first network node and/or the second network node can determine or adjust transmission configuration for the terminal device.

As described with respect to FIG. 5, the first connection between the first network node and the terminal device may operate on a first RAT/cell/BWP, and the second connection between the second network node and the terminal device may operate on a second RAT/cell/BWP. In accordance with some exemplary embodiments, the first cell/BWP and the second cell/BWP may be based on the same RAT or different RATs. Optionally, information sharing between the first network node and the second network node may be implemented as inter-BWP information sharing within the same cell.

The proposed solution according to some exemplary embodiments can enable a network node (e.g., a gNB/eNB) to share channel/measurement information (e.g., a beam report, a power report, etc.) and/or resource/transmission configuration (e.g., beam selection, power control, etc.) with another network node (e.g., an eNB/gNB). Various embodiments may be applicable not only to information exchanging through an inter-RAT interface between 4G/LTE and 5G/NR networks, but also carrier aggregation, even intra-cell inter-BWP coordination. The proposed solution can advantageously improve network performance and enhance resource efficiency, without significantly increasing signaling overhead and computing load.

The various blocks shown in FIGS. 5-6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
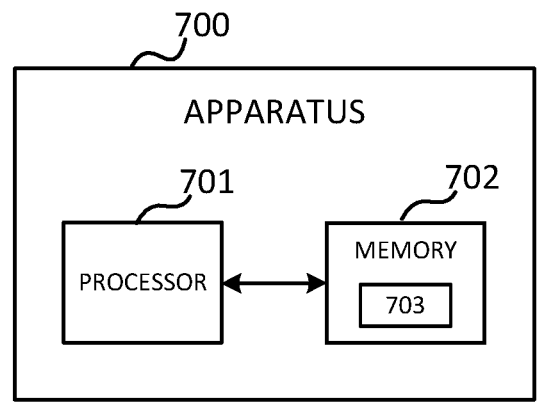
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In accordance with some exemplary embodiments, the apparatus 700 may be implemented as an integrated circuit chip or module that can be plugged or installed into a first network node as described with respect to FIG. 5, or a second network node as described with respect to FIG. 6. In such case, the apparatus 700 may be implemented as a first network node as described with respect to FIG. 5, or a second network node as described with respect to FIG. 6.

In some implementations, the one or more memories 702 and the computer program codes 703 may be configured to, with the one or more processors 701, cause the apparatus 700 at least to perform any operation of the method as described in connection with FIG. 5. In other implementations, the one or more memories 702 and the computer program codes 703 may be configured to, with the one or more processors 701, cause the apparatus 700 at least to perform any operation of the method as described in connection with FIG. 6.

Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8A:
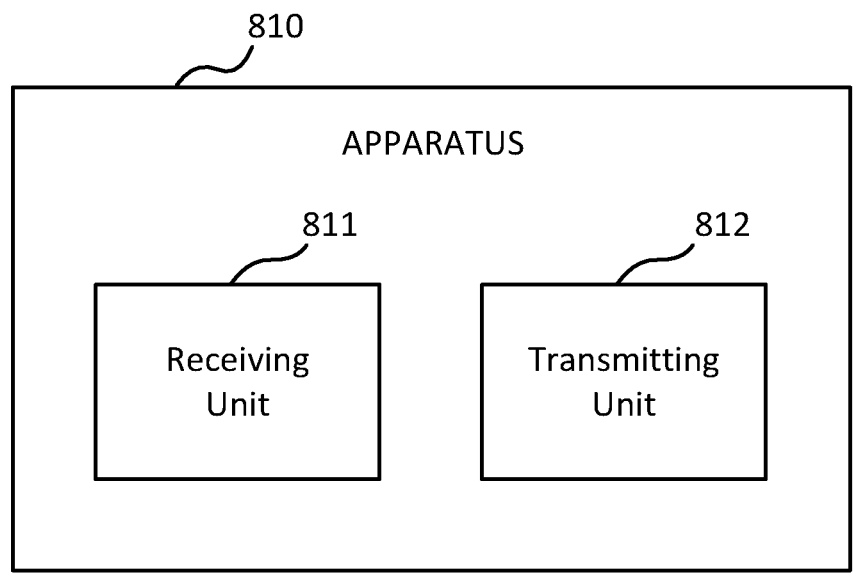
FIG. 8A is a block diagram illustrating another apparatus according to some embodiments of the present disclosure.

FIG. 8A is a block diagram illustrating an apparatus 810 according to some embodiments of the present disclosure. As shown in FIG. 8A, the apparatus 810 may comprise a receiving unit 811 and a transmitting unit 812. In an exemplary embodiment, the apparatus 810 may be implemented as a first network node (such as the first network node described with respect to FIG. 5). The receiving unit 811 may be operable to carry out the operation in block 502, and the transmitting unit 812 may be operable to carry out the operation in block 504. Optionally, the receiving unit 811 and/or the transmitting unit 812 may be operable to carry out more or less operations to implement the proposed methods according to the exemplary embodiments of the present disclosure.

Figure 8B:
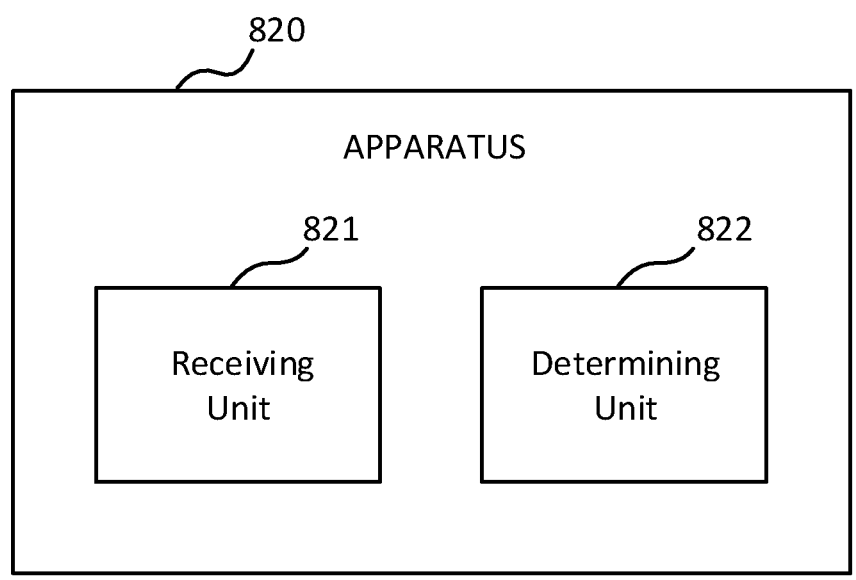
FIG. 8B is a block diagram illustrating yet another apparatus according to some embodiments of the present disclosure.

FIG. 8B is a block diagram illustrating an apparatus 820 according to some embodiments of the present disclosure. As shown in FIG. 8B, the apparatus 820 may comprise a receiving unit 821 and a determining unit 822. In an exemplary embodiment, the apparatus 820 may be implemented as a second network node (such as the second network node described with respect to FIG. 6). The receiving unit 821 may be operable to carry out the operation in block 602, and the determining unit 822 may be operable to carry out the operation in block 604. Optionally, the receiving unit 821 and/or the determining unit 822 may be operable to carry out more or less operations to implement the proposed methods according to the exemplary embodiments of the present disclosure.

Figure 9:
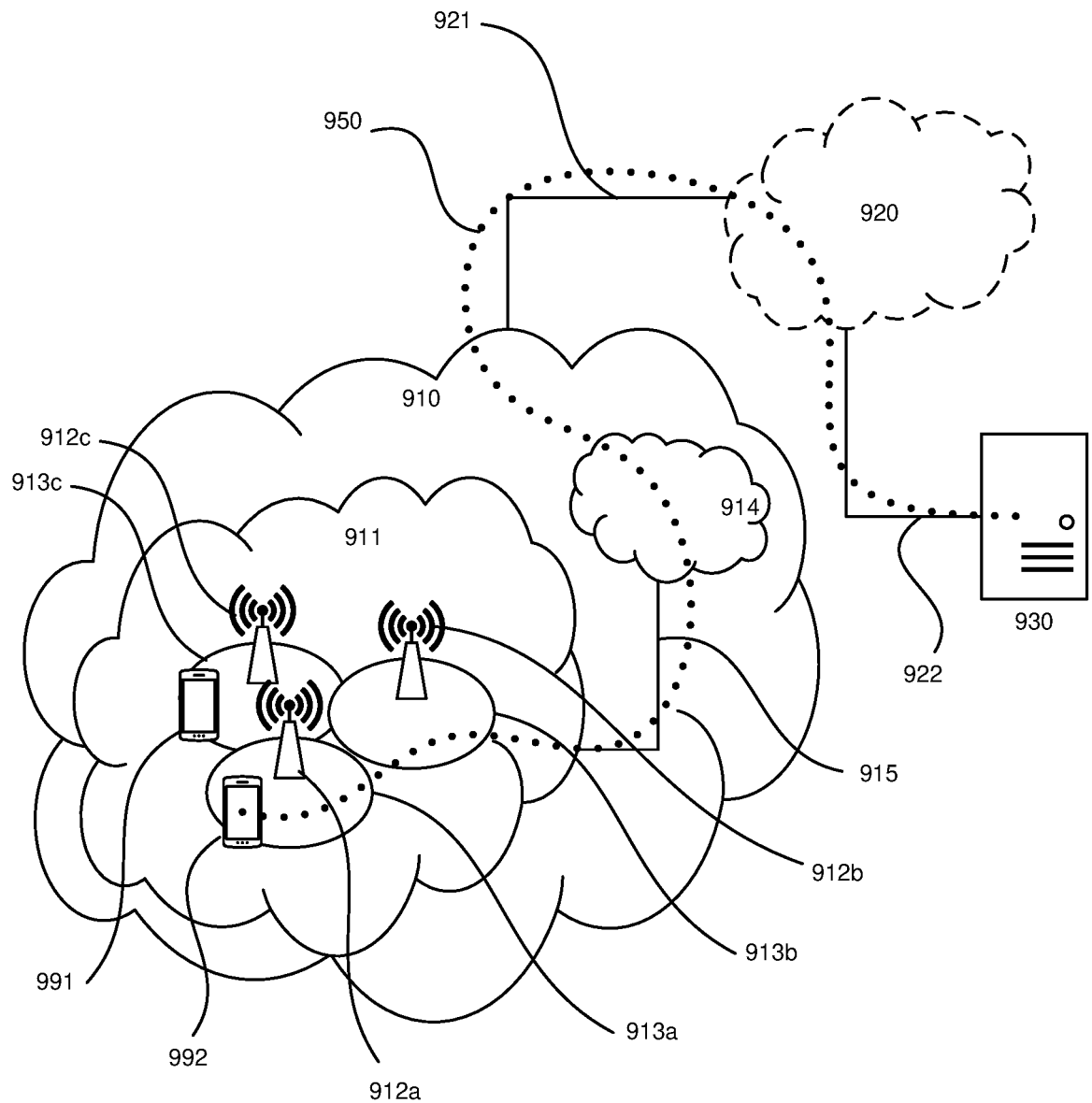
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
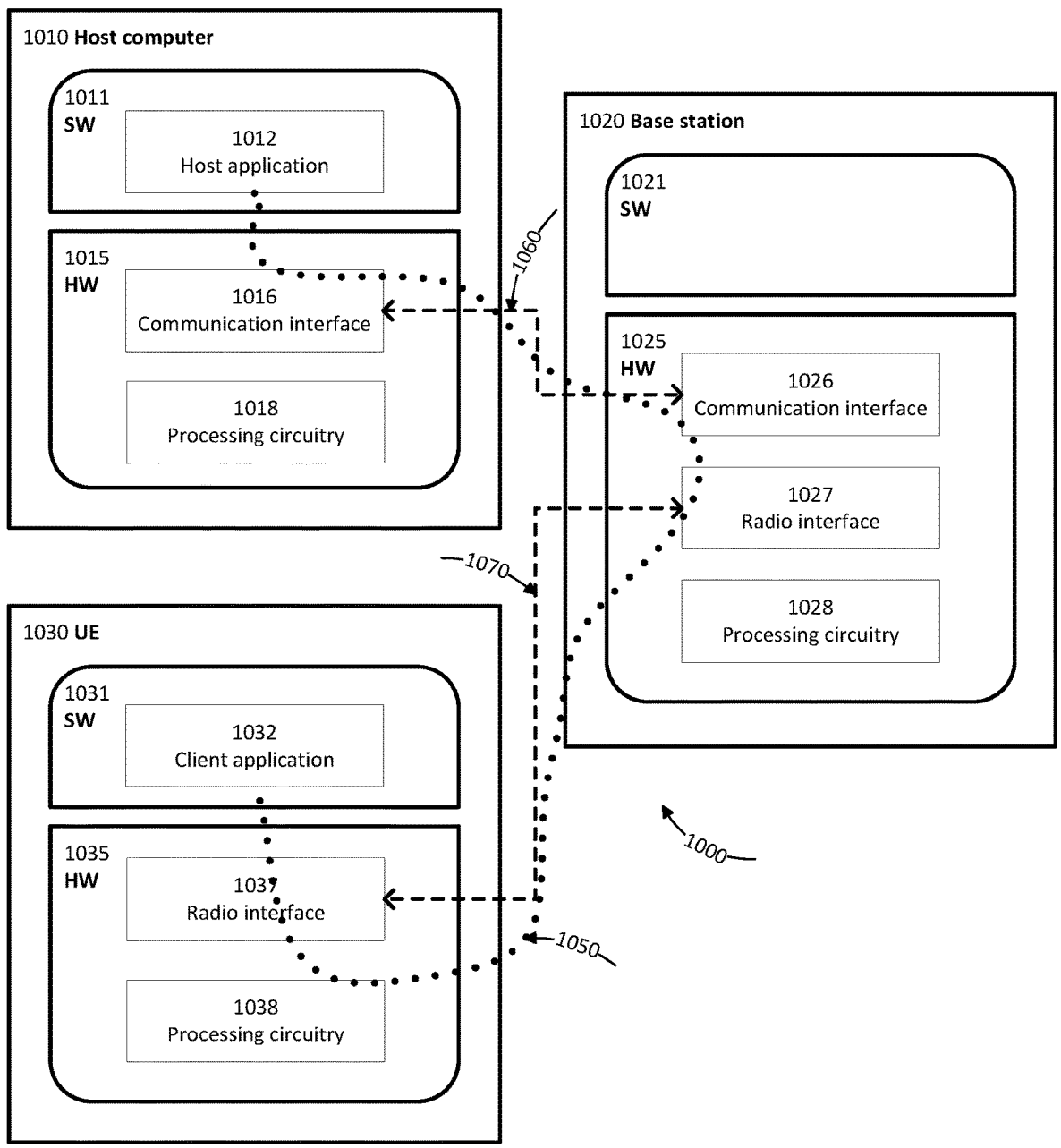
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
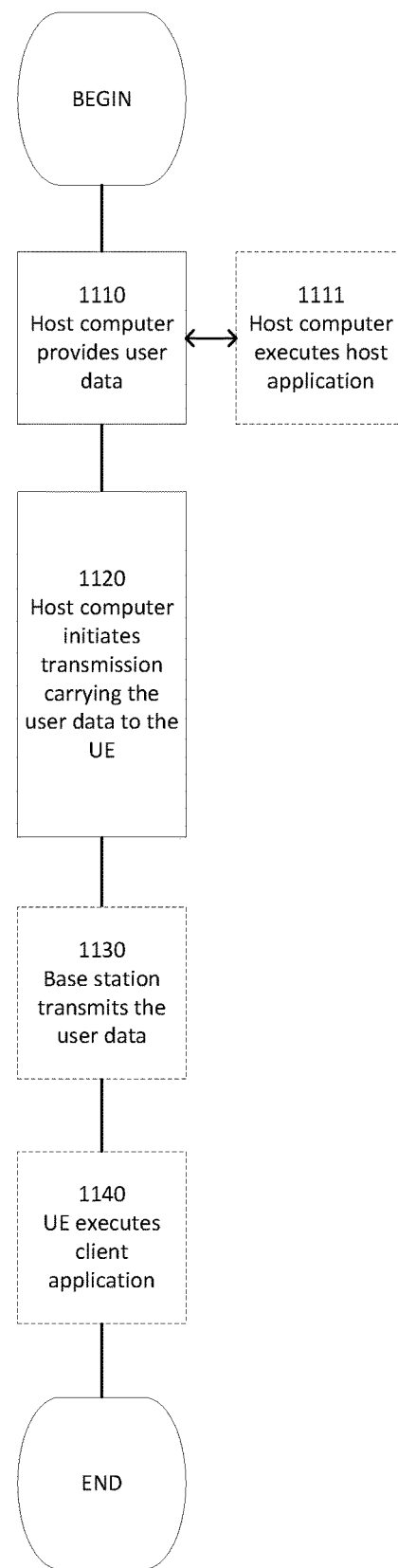
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In sub step 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
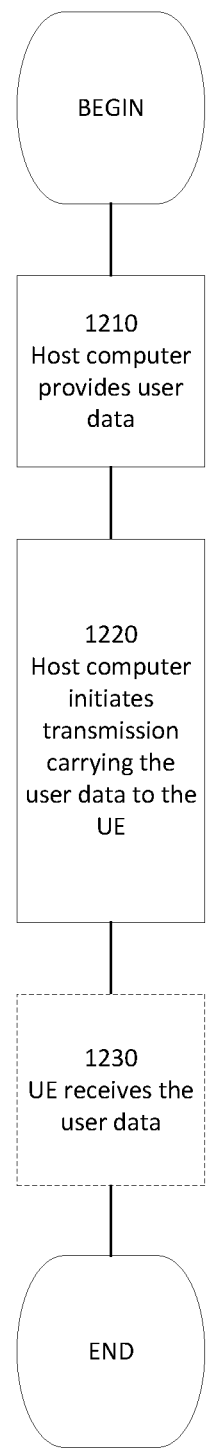
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
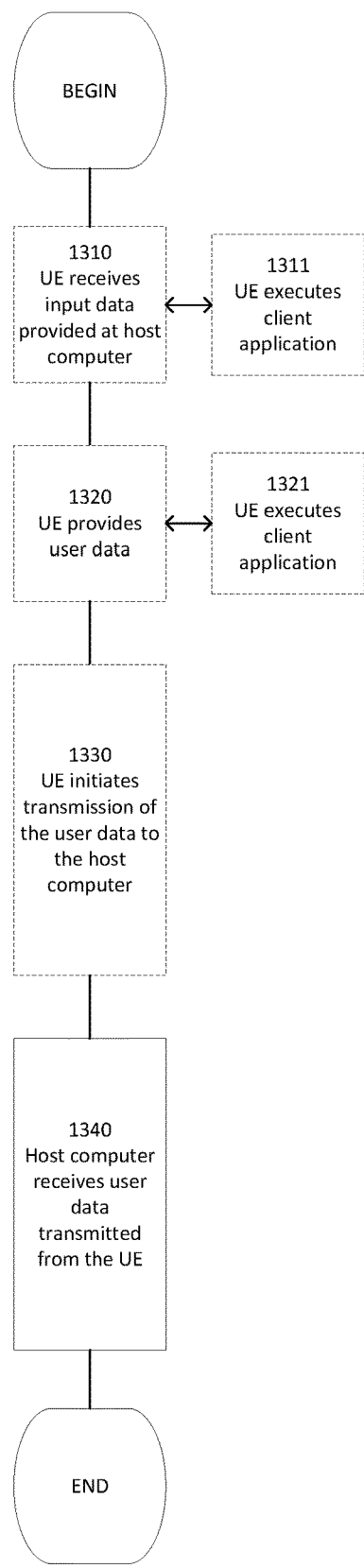
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
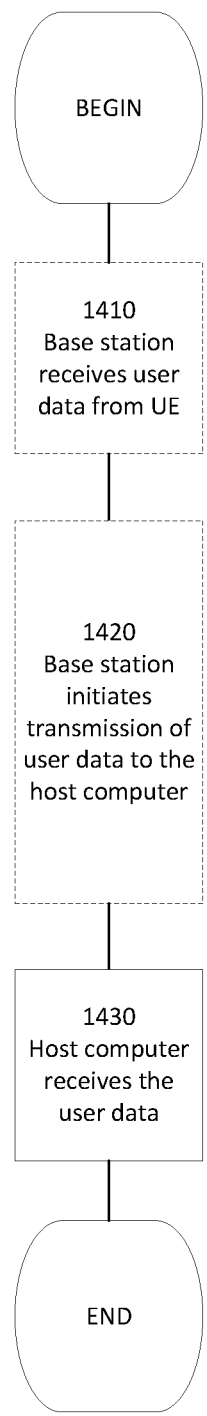
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network node configured to operate in a wireless communication network, the method comprising:
    receiving a first measurement report from a terminal device capable of communicating with the first network node over a first connection and with a second network node over a second connection;
    transmitting, to the second network node, first measurement information based at least in part on the first measurement report, wherein the first measurement information is related to one or more of the following that is shared or sharable by the first and second connections to communicate with the terminal device: an antenna unit of the wireless communication network, a frequency band, and one or more physical resource blocks of a bandwidth part;
    determining a candidate beam set according to the first measurement information, wherein each beam of the candidate beam set has respective correlations with one of the following:
        other beams of the candidate set, with the correlations indicating respective degrees of interference between the beam and the other beams, or
        with a second beam currently assigned to the second network node, with the correlations indicating respective degrees of interference between the beam and the second beam; and
    selecting, from the candidate beam set based on the correlations, one or more beams to be assigned to the at least one of the first network node and the second network node as transmission beams to the terminal device.

2. The method according to claim 1, wherein the first measurement report is related to radio resource that can be shared by the first network node and the second network node.

3. The method according to claim 1, wherein the first measurement report comprises at least one of:
    channel information;
    signal quality information;
    beam information;
    power information;
    pathloss information; and
    neighboring cell information.

4. The method according to claim 1, wherein the first measurement information is usable for determination of a resource configuration for at least one of the first network node and the second network node.

5. The method according to claim 1, wherein:
    the selected one or more beams include one or more first beams to be assigned to the first network node and one or more second beams to be assigned to the second network node; and
    the one or more first beams and the one or more second beams are selected based on their respective correlations being minimum among the correlations between beams of the candidate beam set.

6. The method according to claim 1, wherein:
    the selected one or more beams comprise one or more first beams to be assigned to the first network node; and
    the one or more first beams are selected based on their correlations with the currently assigned second beam being minimum among the correlations of beams of the candidate beam set.

7. The method according to claim 1, wherein the selection of the one or more beams is performed by at least one of the first network node and the second network node according to a predefined rule.

8. The method according to claim 1, wherein the first measurement information is usable by the second network node for adjustment of a measurement result from the terminal device.

9. The method according to claim 1, wherein the first measurement information is usable by at least one of the first network node and the second network node for a determination of a transmission configuration for the terminal device.

10. The method according to claim 1, further comprising receiving second measurement information from the second network node, wherein the second measurement information is related to one or more of the following that is shared or sharable by the first and second connections for transmission to and reception from the terminal device: the antenna unit, the frequency band, and the one or more physical resource blocks of the bandwidth part.

11. The method according to claim 10, wherein further comprising determining, based on the second measurement information, a transmission configuration for the terminal device.

12. The method according to claim 10, wherein the second measurement information is based at least in part on a second measurement report provided to the second network node by the terminal device, wherein the second measurement report comprises at least one of:
- channel information;
- signal quality information;
- beam information;
- power information;
- pathloss information; and
- neighboring cell information.

13. The method according to claim 1, wherein the first connection is based on a first radio access technology, and the second connection is based on a second radio access technology.

14. The method according to claim 13, wherein the first radio access technology comprises a new radio (NR) based radio access technology, and the second radio access technology comprises a long-term evolution (LTE) based radio access technology.

15. The method according to claim 1, wherein the first and second connections are via respective first and second cells that share the frequency band.

16. The method according to claim 1, wherein the first connection uses a first bandwidth part, the second connection uses a second bandwidth part, and the first bandwidth part includes the one or more physical resource blocks, which can be shared by the second bandwidth part.

17. A method performed by a second network node configured to operate in a wireless communication network, the method comprising:
- receiving, from a first network node, first measurement information based at least in part on a first measurement report provided to the first network node by a terminal device capable of communicating with the first network node over a first connection and with the second network node over a second connection, wherein the first measurement information is related to one or more of the following that is shared or sharable by the first and second connections to communicate with the terminal device: an antenna unit of the wireless communication network, a frequency band, and one or more physical resource blocks of a bandwidth part; and
- determining a resource configuration for the second network node based at least in part on the first measurement information, wherein determining the resource configuration comprises:
  - determining a candidate beam set according to the first measurement information, wherein each beam of the candidate beam set has respective correlations with one of the following:
    - other beams of the candidate set, with the correlations indicating respective degrees of interference between the beam and the other beams, or
    - with a second beam currently assigned to the second network node, with the correlations indicating respective degrees of interference between the beam and the second beam; and
  - selecting, from the candidate beam set based on the correlations, one or more beams to be assigned to the at least one of the first network node and the second network node.

18. A first network node configured to operate in a wireless communication network, the first network node comprising:
- one or more processors; and
- one or more memories comprising computer-executable instructions that, when executed by the one or more processors, configure the first network node to perform operations corresponding to the method of claim 1.

19. A second network node configured to operate in a wireless communication network, the second network node comprising:
- one or more processors; and
- one or more memories comprising computer-executable instructions that, when executed by the one or more processors, configure the second network node to perform operations corresponding to the method of claim 17.

* * * * *